United States Patent
Peilloud

(10) Patent No.: US 6,297,629 B1
(45) Date of Patent: *Oct. 2, 2001

(54) DEVICE FOR MEASURING ROTATION HAVING MAGNETIC RELATIVE POSITIONING OF ENCODER AND SENSOR

(75) Inventor: Fernand Peilloud, Hery sun Alby (FR)

(73) Assignee: The Torrington Company, Torrington, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/023,433

(22) Filed: Feb. 13, 1998

(30) Foreign Application Priority Data

Feb. 14, 1997 (FR) .................................... 97-01726

(51) Int. Cl.[7] .................. G01B 7/14; G01R 33/00

(52) U.S. Cl. .................. 324/207.25; 324/207.22
(58) Field of Search .................. 324/207.25, 207.22, 324/207.2, 207.21, 207.24, 173, 174; 335/303; 216/22

(56) References Cited

U.S. PATENT DOCUMENTS

| | | | |
|---|---|---|---|
| 4,839,591 | * | 6/1989 | Nomura et al. . |
| 5,081,756 | * | 1/1992 | Abe et al. . |
| 5,157,329 | * | 10/1992 | Brauer . |
| 5,635,833 | * | 6/1997 | Onodera et al. .......... 324/207.22 |

* cited by examiner

Primary Examiner—Walter Snow
(74) Attorney, Agent, or Firm—John C. Bigler

(57) ABSTRACT

A device for measuring the rotation of a rotating element which contains a magnetic encoder which turns with the rotating element and a sensor integrated with a support which is immobilized in terms of rotation. The magnetic encoder is maintained in close proximity to the sensor by the application of magnetic attraction forces between the magnetic encoder and the support, which is produced, at least partially, out of magnetic material.

8 Claims, 2 Drawing Sheets

US 6,297,629 B1

DEVICE FOR MEASURING ROTATION HAVING MAGNETIC RELATIVE POSITIONING OF ENCODER AND SENSOR

BACKGROUND OF THE INVENTION

The present invention relates generally to a device for measuring the rotation of a rotating element and, more particularly to a device that contains a magnetic encoder to be maintained in the vicinity of a sensor.

Conventionally, devices for measuring the angular position or the speed of a rotating element contain a sensor, which is maintained immobile with respect to the measurement reference frame, and a magnetic encoder driven in rotation by the shaft, the sensor cooperating with the magnetic encoder in order to provide a signal to an electronic station that processes the information. Such devices have the disadvantage of requiring an air gap between the magnetic encoder and the sensor. A variation of the air gap, for example in the case of extensive vibrations of the rotating element, can lead to incorrect information.

In order to remedy this difficulty, a known method is to use a means of application, such as an elastic washer, in order to maintain the magnetic encoder in close proximity to the sensor. An example of this type of device is described and represented in the document FR-A-2 688 606 submitted by the applicant. However, this solution leads to a rather complex device, which contains numerous pieces to be assembled, thus generating a large space requirement and a high cost of the device, which makes it poorly suited to the simplest applications.

The foregoing illustrates limitations known to exist in present devices and methods. Thus, it is apparent that it would be advantageous to provide an alternative directed to overcoming one or more of the limitations set forth above. An object of the present invention is therefore to propose a device for measuring the rotation of a rotating element which has a small space requirement and which ensures good positioning and maintaining of a constant air gap between the magnetic encoder and the sensor and which is simple and economical to realize. Accordingly, a suitable alternative is provided including features more fully disclosed hereinafter.

SUMMARY OF THE INVENTION

In one aspect of the invention, this is accomplished by providing a device for measuring the rotation of a rotating element, comprising a magnetic encoder which turns with the rotating element and a sensor integrated with a support which is immobilized with respect to the rotating element. The magnetic encoder is maintained in close proximity to the sensor by magnetic application means comprising the magnetic encoder and the support, the support being produced, at least partially, from magnetic material.

BRIEF DESCRIPTION OF THE DRAWING FIGURES

In order to facilitate the reading of the drawings, the same parts bear the same references from one figure to the other. Furthermore, only the elements necessary for comprehension of the invention are shown.

DETAILED DESCRIPTION

Figure 1:
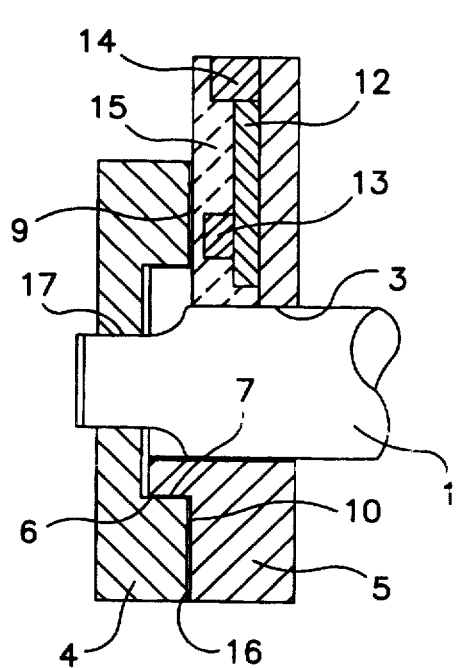
FIG. 1 is a view in axial section of a device for measuring the rotation of a shaft illustrating a first embodiment of the present invention.
Figure 2:
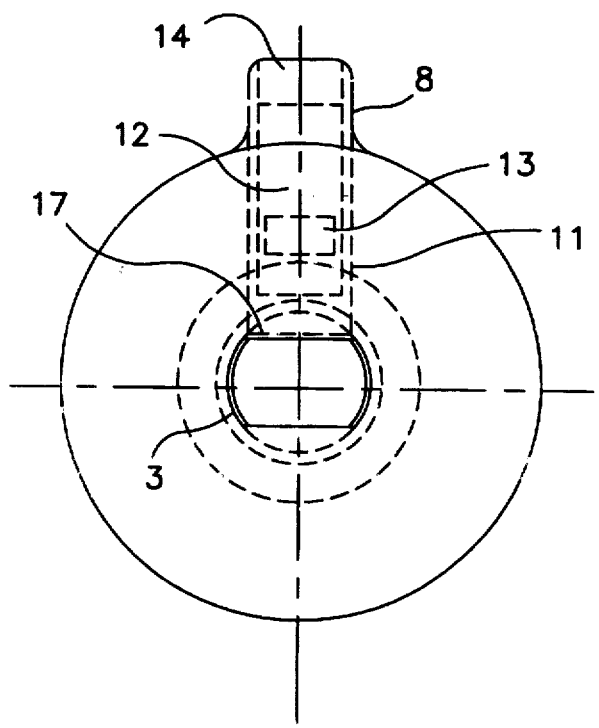
FIG. 2 is an end view of the device illustrated in FIG. 1.
Figure 3:
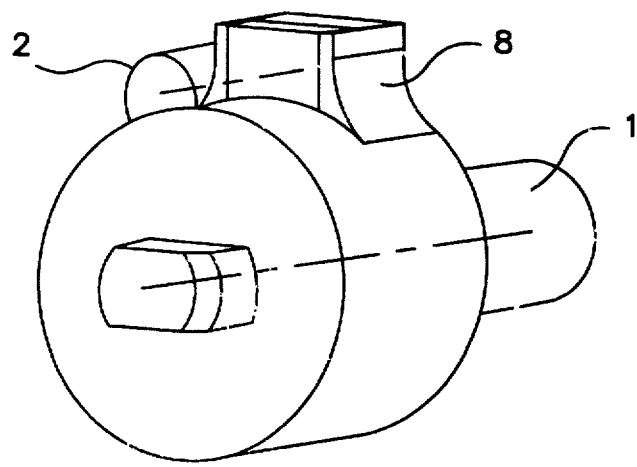
FIG. 3 is a perspective view of the device illustrated in FIGS. 1 and 2.

Referring now to the drawings, FIGS. 1, 2 and 3 illustrate a device for measuring the rotation of shaft 1, which contains magnetic encoder 4 rotating with shaft 1 and sensor 13 borne by support 5 which is immobile with respect to the measurement frame of reference, with sensor 13 cooperating with magnetic encoder 4 in order to determine the speed or the angular position of shaft 1.

Magnetic encoder 4, annular in shape, is mounted on shaft 1 by means of prismatic bore 17 which cooperates with two parallel flat parts arranged at the end of shaft 1, the assembly formed in this way allowing magnetic encoder 4 to be driven in rotation by shaft 1 and magnetic encoder 4 to be immobilized axially by a force fitting of bore 17 on shaft 1. Magnetic encoder 4, centered on shaft 1, has support wall 9 which is magnetized with multipolar permanent magnetization facing a corresponding surface 10 of support 5. Support 5, produced out of a ferromagnetic material such as iron or soft steel, has cylindrical bore 3 in its center, allowing passage of shaft 1 and axial displacement of support 5 against magnetic encoder 4.

On the side of surface 10, support 5 also has cylindrical shoulder 7 inserted in cylindrical recess 6 of magnetic encoder 4 on the side of support wall 9. The longitudinal dimension of shoulder 7 is less than the depth of recess 6 so as to allow support wall 9 of magnetic encoder 4 to come in contact with surface 10 of support 5. Furthermore, the diameters of cylindrical recess 6 and shoulder 7 are selected so that it is possible to ensure simultaneously the coaxial nature and the relative free rotation of magnetic encoder 4 with respect to support 5.

Support 5 has radial extension 8 in which parallelepipedic groove 11 is arranged, which extends radially on surface 10, from bore 3 to the exterior surface of radial extension 8. This radial extension 8 serves as a stop in terms of rotation of support 5 against stop 2 which is connected without rotational play with the measurement frame of reference. Groove 11 carries electronic circuit 12 which has sensor 13, which is produced by at least one Hall-effect probe or a magnetoresistor, some means of processing of the signal and some means of input and output connections with connector 14. Sensor 13 is arranged in groove 11 at such a radial distance that it comes to face magnetic encoder 4 when the latter is against support 5. The electronic assembly thus produced, electrically insulated from support 5, is duplicate molded out of a protective insulating material 15 up to the level of surface 10 of support 5.

A film of self-lubricating material 16, facilitating the sliding in rotation of magnetic encoder 4 over support 5, is inserted between support wall 9 and surface 10. In the embodiment illustrated, the film consists of a thin film which has an adhesive surface adhered to surface 10 of support 5. The other surface of the film, in contact with support wall 9 of magnetic encoder 4 consists, for example, of a material of the PTFE type known for its low coefficient of friction. In the device thus executed, the multipolar magnetic field delivered by support wall 9 of magnetic encoder 4 is simultaneously an input signal of sensor 13 and an element for holding support 5 against magnetic encoder 4 by the force of attraction which it generates, consequently allowing a constant air gap for reading to be maintained between sensor 13 and magnetic encoder 4 during the relative rotation of the latter elements.

Figure 4:
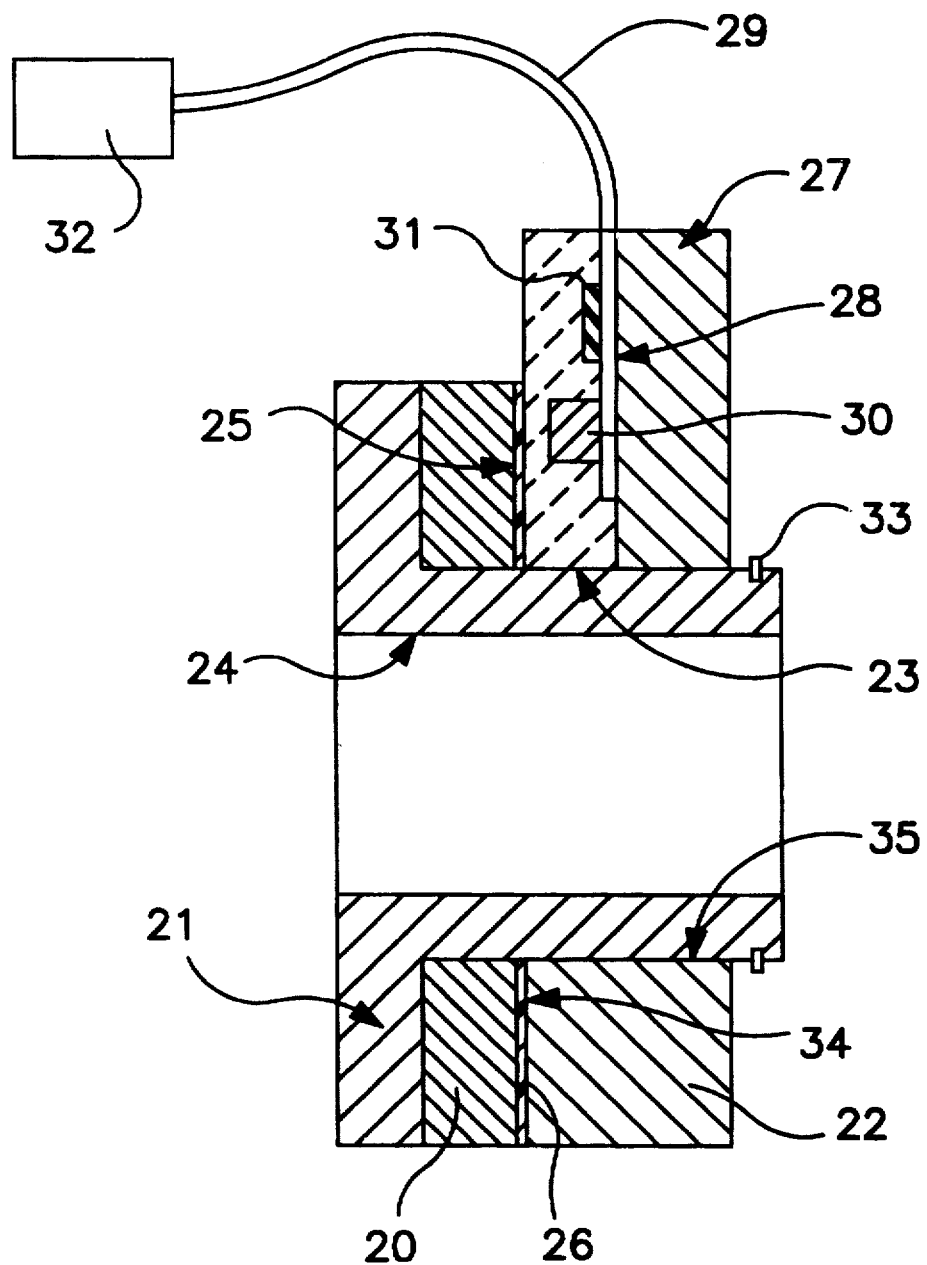
FIG. 4 is a view in axial section of a device for measuring the rotation of a shaft illustrating a second embodiment of the present invention.

FIG. 4 illustrates a second embodiment of the device according to the present invention. In a manner similar to the device described in the preceding embodiment, this device has magnetic encoder 20 which is driven in rotation by shaft 1, which is not represented in this figure, and sensor 30 borne by support 22 which is immobile with respect to the measurement reference frame. Sensor 30 cooperates with magnetic encoder 20 in order to determine the speed or the angular position of shaft 1.

Magnetic encoder 20, consisting of an annular multipolar magnet, is attached concentrically by one of its surfaces, for example, by adhesive, against the shoulder of hub 21; the other surface forms support wall 25 which is intended to face surface 34 of support 22. Hub 21 has prismatic bore 24 which cooperates, by force fitting, with two flat parts of shaft 1 so as to bring about the relative immobilization of the latter elements. Hub 21 is lengthened through multipolar magnet 20 by cylindrical portion 23 which is inserted in bore 35 of support 22, the diameter of bore 35 being selected with respect to the diameter of cylindrical portion 23 so as to ensure simultaneously the coaxial nature and the free rotation of hub 21 with respect to support In a manner similar to support 5 of FIG. 2, support 22, roughly annular in shape, has radial extension 27 serving as a stop in terms of rotation of support 22 against a part, not represented in the figure, which is connected without rotational play with the measurement frame of reference. Radial extension 27 has parallelepipedic groove 28 extending radially on surface 34 from bore 35 to the exterior surface of radial extension 27. This groove 28 carries electronic circuit 29 consisting of a flexible film bearing conductive traces connecting sensor 30, produced by at least one Hall-effect probe or a magnetoresistor, module 31 for processing of the signal, and connector 32 allowing for the electrical supply and the output of the signal delivered by sensor 30. A film of self-lubricating material 26, facilitating sliding in rotation of multipolar magnet 20 against support 22, is inserted between support wall 25 of multipolar magnet 20 and surface 34 of support 22.

This embodiment of the invention makes it possible, in a simple and effective manner, to maintain a constant air gap between sensor 30 and multipolar magnet 20, while allowing a rapid mounting on shaft 1. In effect, the multipolar magnetic field delivered by support wall 25 of multipolar magnet 20 is simultaneously an input signal of sensor 30 and an element for holding support 22 against multipolar magnet 20 by the force of attraction which it generates. Such a device also has the advantage that it can be preassembled before being mounted on shaft 1; stop 33 can be mounted at the end of cylindrical portion 23 of hub 21 in order to avoid any risk of disassembling the device during the operations necessary for mounting.

The two embodiments of the device according to the present invention therefore make it possible, in a simple and rapid manner, to maintain a magnetic encoder with a constant air gap with respect to a sensor. The magnetic encoder is maintained in close proximity to the sensor by magnetic application means consisting, on the one hand, of the magnetic encoder, and on the other hand, of the support which is produced at least partially from magnetic material, the force of magnetic attraction created between the magnetic encoder and the magnetic material of the support maintaining the latter elements in contact. The support may be made of ferromagnetic material, and the magnetic encoder may be magnetized with multipolar permanent magnetization on its surface in contact with the support.

According to another characteristic of the device to which the invention relates, the magnetic encoder and the support have an annular shape, the support also having a radial extension allowing it to be immobilized with respect to a stationary element. The support may have a cylindrical shoulder which fits in a cylindrical recess arranged in the magnetic encoder in order to bring about the axial guiding of the magnetic encoder with respect to the support, the annular magnetic encoder being driven in rotation by the rotating element by means of a prismatic assembly. The sensor may be produced by a Hall-effect or magnetoresistor magnetic field measuring probe, the measuring probe being arranged on the support, slightly recessed from the surface of contact between the support and the magnetic encoder, and connected to a connector by an electronic connection circuit.

Of course, the invention is in no way limited to the embodiment described and illustrated, which was only given as an example. On the contrary, the invention includes all technical equivalents of the means which have been described as well as their combinations if they are executed according to the intent of the invention. Thus, the prismatic type connection between the shaft in rotation and the magnetic encoder can be replaced by any type of connection solidly connecting the magnetic encoder with the shaft. Also, it is possible to mount the magnetic encoder so as to be axially mobile with respect to the shaft and to mount the sensor support so as to be stationary with respect to the shaft, the magnetic field then axially holding the magnetic encoder against the support.

Having described the invention, what is claimed is:

1. A device for measuring the rotation of a rotating element, comprising:

a magnetic encoder which turns with the rotating element; and a sensor integrated with a support which is immobilized in terms of rotation with respect to the rotating element;

the magnetic encoder being maintained in close proximity to the sensor by magnetic application means comprising the magnetic encoder and the support, the support being produced, at least partially, from magnetic material, a self-lubricating film being provided on the surface of contact between the magnetic encoder and the support.

2. The device for measuring the rotation of a rotating element according to claim 1, wherein the support is produced from a ferromagnetic material.

3. The device for measuring the rotation of a rotating element according to claim 1, wherein the magnetic encoder is magnetized with multipolar permanent magnetization on a surface of the magnetic encoder in contact with the support.

4. The device for measuring the rotation of a rotating element according to claim 1, wherein the self-lubricating film is composed of a film which has an adhesive surface adhered to the support, the other surface of the film being in contact with the magnetic encoder and mainly consisting of a material known to have a low coefficient of friction.

5. The device for measuring the rotation of a rotating element according to claim 1, wherein the magnetic encoder and the support have an annular shape, the support also having a radial extension facilitating immobilization of the support with respect to a stationary element.

6. The device for measuring the rotation of a rotating element according to claim 5, wherein the support has a cylindrical shoulder which fits into a cylindrical recess provided in the magnetic encoder in order to bring about the axial guiding of the magnetic encoder with respect to the support, the magnetic encoder being driven in rotation by the rotating element.

7. The device for measuring the rotation of a rotating element according to claim 5, wherein the magnetic encoder is borne by a hub which is driven in rotation by the rotating element, the hub having a cylindrical bearing surface inserted in a bore of the support in order to bring about the axial guiding of the support with respect to the magnetic encoder.

8. The device for measuring the rotation of a rotating element according to claim 1, wherein the sensor is produced by a Hall-effect or magnetoresistor magnetic field measuring probe, the measuring probe being arranged on the support, recessed from a surface of contact between the support and the magnetic encoder, and connected to an electronic connection circuit.

* * * * *